(12) United States Patent
Czibur et al.

(10) Patent No.: US 10,498,127 B2
(45) Date of Patent: Dec. 3, 2019

(54) LINK BOX WITH REMOVABLE CABLE ENTRY SEALS

(71) Applicant: TE Connectivity Corporation, Berwyn, PA (US)

(72) Inventors: Alexander R. Czibur, Fuquay-Varina, NC (US); Mahmoud K. Seraj, Apex, NC (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 15/716,203

(22) Filed: Sep. 26, 2017

(65) Prior Publication Data

US 2019/0097408 A1   Mar. 28, 2019

(51) Int. Cl.
*H02G 15/013* (2006.01)
*H02G 3/08* (2006.01)
(Continued)

(52) U.S. Cl.
CPC ........... *H02G 15/013* (2013.01); *H02G 3/081* (2013.01); *H02G 3/083* (2013.01); *H02G 9/10* (2013.01); *H01R 4/34* (2013.01)

(58) Field of Classification Search
CPC ............................ H05K 9/0098; H02G 15/013
See application file for complete search history.

(56) References Cited

U.S. PATENT DOCUMENTS 4,896,000 A * 1/1990 Procter ................... H01R 4/64
174/360
8,013,250 B2   9/2011 Hurrell et al.
(Continued)

FOREIGN PATENT DOCUMENTS

EP   1 323 211 B1   11/2006
GB   648799   1/1951
(Continued)

OTHER PUBLICATIONS

O-ring, 10 pages, date Jul. 2, 2018, https://en.wikipedia.org/wiki/O-ring.*

(Continued)

*Primary Examiner* — Hung V Ngo
(74) *Attorney, Agent, or Firm* — Myers Bigel, P.A.

(57) ABSTRACT

A link box includes a housing that defines an enclosure, an electrical connector within the enclosure, an aperture formed through a wall of the housing, and a cable entry seal secured to the housing at the aperture. The cable entry seal receives a cable inserted into the housing for connection to the electrical connector. The cable entry seal includes first and second parts that are removably secured together. The first part includes a flange and an externally-threaded portion that extends outwardly from the flange. The externally-threaded portion is inserted through the aperture from within the enclosure such that the flange abuts an internal surface of the wall. The second part includes an internally-threaded body and a seal conduit that extends outwardly from the internally-threaded body. The internally-threaded body is threadingly engaged with the externally-threaded portion of the first part and the seal conduit surrounds and seals the cable.

12 Claims, 6 Drawing Sheets

(51) Int. Cl.
    *H02G 9/10*      (2006.01)
    *H01R 4/34*      (2006.01)

(56) References Cited

U.S. PATENT DOCUMENTS

| | | | | |
|---|---|---|---|---|
| 2014/0060876 A1* | 3/2014 | Imes | ............ | H02G 3/16 |
| | | | | 174/59 |
| 2016/0089846 A1* | 3/2016 | McCartney | ............ | B32B 1/08 |
| | | | | 428/34.9 |
| 2016/0265761 A1* | 9/2016 | Yang | ............ | F21V 33/006 |

FOREIGN PATENT DOCUMENTS

| | | |
|---|---|---|
| WO | WO 03/081727 A1 | 10/2003 |
| WO | WO 2009/055847 A1 | 5/2009 |
| WO | WO 2010/141090 A2 | 12/2010 |

OTHER PUBLICATIONS

TE Connectivity, Datasheet—"Raychem Heat-Shrinkable Cable Entry Seals—Watertight, Fume-Tight Cable Entry Seals for Boxes, Bulkheads, and Other Enclosures", Jul. 2015, 4 pp.

Tyco Electronics Raychem GmbH, Datasheet—"Link Boxes Cross bonding and sectionalisation for high-voltage cable systems", Jul. 2000, 4 pp.

Raychem Corporation, Product Installation Instructions—"Cross-bonding Link Box with Sheath Voltage Limiting Arresters", PII-54965 Rev AA / DCR C28788 / PCN 797153-000, Mar. 6, 1997, 6 pp.

Raychem Corporation, Product Installation Instructions—"CFTS Cabinet Feed-Thru Seal", PII-51057, Rev. AD / DCR C26776 / PCN 524271-000, Nov. 1994, 4 pp.

\* cited by examiner

LINK BOX WITH REMOVABLE CABLE ENTRY SEALS

FIELD OF THE INVENTION

The present invention relates to electrical cables and, more particularly, to link boxes for electrical cables.

BACKGROUND

Link boxes are used where it is desired temporarily to interrupt the supply of electric current in a cable or cables, e.g., a three-phase AC mains supply. Such boxes may be installed in underground chambers in roadways or other paved areas. A link box is interposed between two parts of a cable and serves to either permit or interrupt the flow of current along the cable. In such a case, the link box contains two sets of terminals, for the individual cores of the two parts of the cable, and a set of mechanical links are used to connect the corresponding terminals to complete the current path. Physical removal of the link interrupts the flow of current. More complex arrangements are also possible in which a number of cables are connected to a link box and a variety of possible connections can be achieved by the use of appropriate links.

An exemplary link box 10 is illustrated in FIG. 1. The link box 10 includes a housing 12 having a base panel 14 with opposite first and second walls 16a, 16b and opposite third and fourth walls 18a, 18b extending outwardly therefrom to form an enclosure 20. A panel 22 (FIG. 2) can be secured to the housing 12 to cover the enclosure 20. The housing 12 and panel 22 are typically formed from metal, such as stainless steel.

Within the enclosure 20 of the illustrated link box 10 are a plurality of sheath voltage limiters (SVLs) 30 to which electrical cables 40 are connected, as illustrated in FIG. 2. These cables 40 extend into the enclosure 20 via respective metal ports 50 in wall 16a. Each cable 40 is sealed to a metal port 50 via heat shrink tubing 60, as illustrated in FIG. 3. As shown in FIG. 3, a heat source H provides heat necessary to shrink the heat shrink tubing around each respective cable 40 and port 50.

To disconnect a cable 40 from a conventional link box, such as box 10 of FIGS. 1-2, a user must cut off the heat shrink tubing 60 from around the metal ports 50. Unfortunately, this may be time consuming and inconvenient for a technician, typically out in the field.

SUMMARY

According to embodiments of the invention, a link box includes a housing that defines an enclosure, an electrical connector (e.g., a sheath voltage limiter, etc.) mounted to the housing within the enclosure, an aperture formed through a wall of the housing, and a cable entry seal secured to the housing at the aperture. The housing may have various shapes and configurations. For example, in some embodiments, the housing includes a base panel, opposite first and second walls extending outwardly from the base panel, and opposite third and fourth walls extending outwardly from the base panel. A door may be movably secured to the housing and that is movable between open and closed positions. The door covers the enclosure when in the closed position, and provides access to the enclosure when in an open position.

The cable entry seal has a passageway extending through a length thereof that is configured to receive a cable that is inserted into the housing for connection to the electrical connector. The cable entry seal includes first and second parts that are removably secured together. The first part includes a flange and an externally-threaded portion that extends outwardly from the flange. The externally-threaded portion is inserted through the aperture from within the enclosure such that the flange abuts an internal surface of the wall. The second part includes an internally-threaded body and a seal conduit that extends outwardly from the internally-threaded body. The internally-threaded body is threadingly engaged with the externally-threaded portion of the first part such that the cable entry seal is secured to the wall. The seal conduit is configured to surround and seal the cable received in the passageway.

In some embodiments, the seal conduit is a heat-shrinkable tube that is configured to, upon the application of heat, shrink around and seal the cable. Exemplary heat-shrinkable materials for the seal conduit include, but are not limited to, polyolefin, fluoropolymer, polyvinyl chloride (PVC), neoprene, silicone elastomer, and fluoropolymer elastomer.

In some embodiments, the cable entry seal further includes a seal element disposed around a section of the externally-threaded portion of the first part or located within the internally-threaded body of the second part. The seal element is configured to provide a water tight connection between the first and second parts. In some embodiments, the seal element is an elastomeric O-ring.

According to additional embodiments of the invention, a link box includes a housing having a plurality of walls that define an enclosure, a plurality of electrical connectors (e.g., sheath voltage limiters, etc.) mounted to the housing within the enclosure, a plurality of apertures formed through a wall of the enclosure in adjacent, spaced-apart relationship, and a respective plurality of cable entry seals, each secured to the housing at a respective aperture. Each cable entry seal has a passageway extending through a length thereof that is configured to receive a respective cable that is inserted into the housing for connection to a respective one of the electrical connectors. Each cable entry seal includes first and second parts that are removably secured together, and a seal element between the first and second parts that is configured to provide a water tight connection therebetween. The seal element is disposed around a section of the externally-threaded portion of the first part or located within the internally-threaded body of the second part.

The first part of each cable entry seal includes a flange and an externally-threaded portion that extends outwardly from the flange. The externally-threaded portion is inserted through a respective aperture from within the enclosure such that the flange abuts an internal surface of the wall. The second part of each cable entry seal includes an internally-threaded body and a heat-shrinkable tube extending outwardly from the internally-threaded body. The internally-threaded body of each second part is threadingly engaged with a respective first part externally-threaded portion such that the respective cable entry seal is secured to the wall. The heat-shrinkable tube is configured to, upon the application of heat, shrink around and seal the cable received in the respective.

Link boxes according to embodiments of the present invention are advantageous over conventional link boxes because manufacturing time and cost may be reduced by the elimination of the flared out metal ports. Moreover, by eliminating the metal ports, the amount of metal material to cut, shape, and form is reduced.

Additionally, link boxes according to embodiments of the present invention are advantageous over conventional link boxes because cables can be disconnected easily and without requiring heat shrink tubing to be cut off before cable removal, which is currently required. Furthermore, cable installation in the field may be easier without the conventional metal ports because of the difficulty in attaching heat shrink tubing around the flared out metal ports.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate some exemplary embodiments. The drawings and description together serve to fully explain the exemplary embodiments.

DETAILED DESCRIPTION

Figure 1:
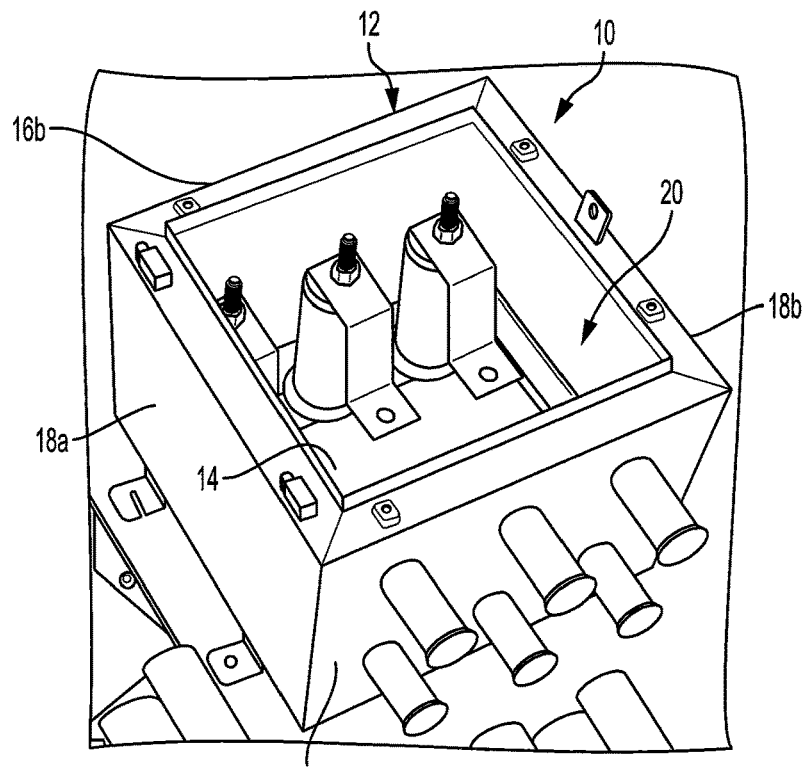
FIG. 1 is a top perspective view of a conventional link box with a cover removed and illustrating electrical connectors, such as SVLs, within the enclosure thereof. The illustrated link box includes a plurality of cable ports with flared ends that are in communication with the enclosure.
Figure 2:
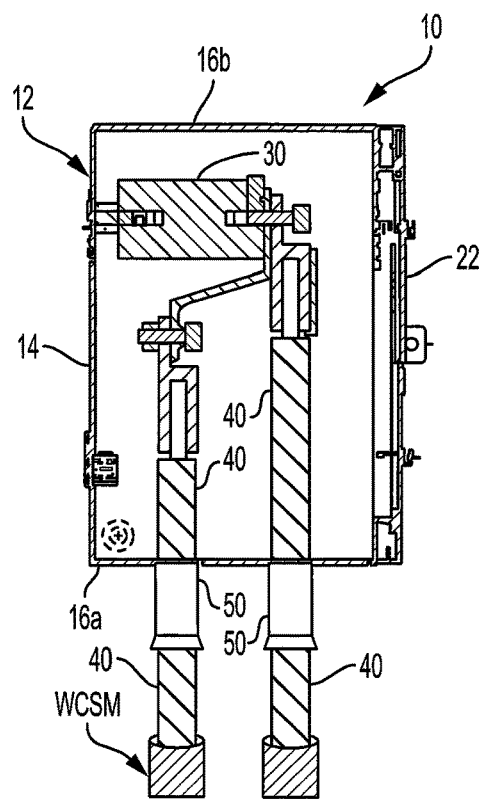
FIG. 2 is a side sectional view of the link box of FIG. 1 with electrical cables connected to the SVLs within the enclosure and prior to the heat shrink tubing being sealed around the cable ports and cables
Figure 3:
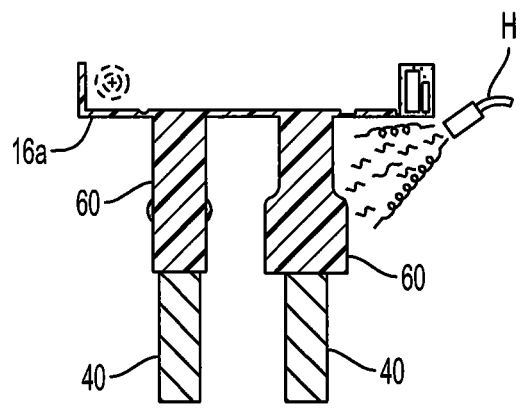
FIG. 3 illustrates the cables of FIG. 2 being sealed to the cable ports via the heat shrink tubing.
Figure 4:
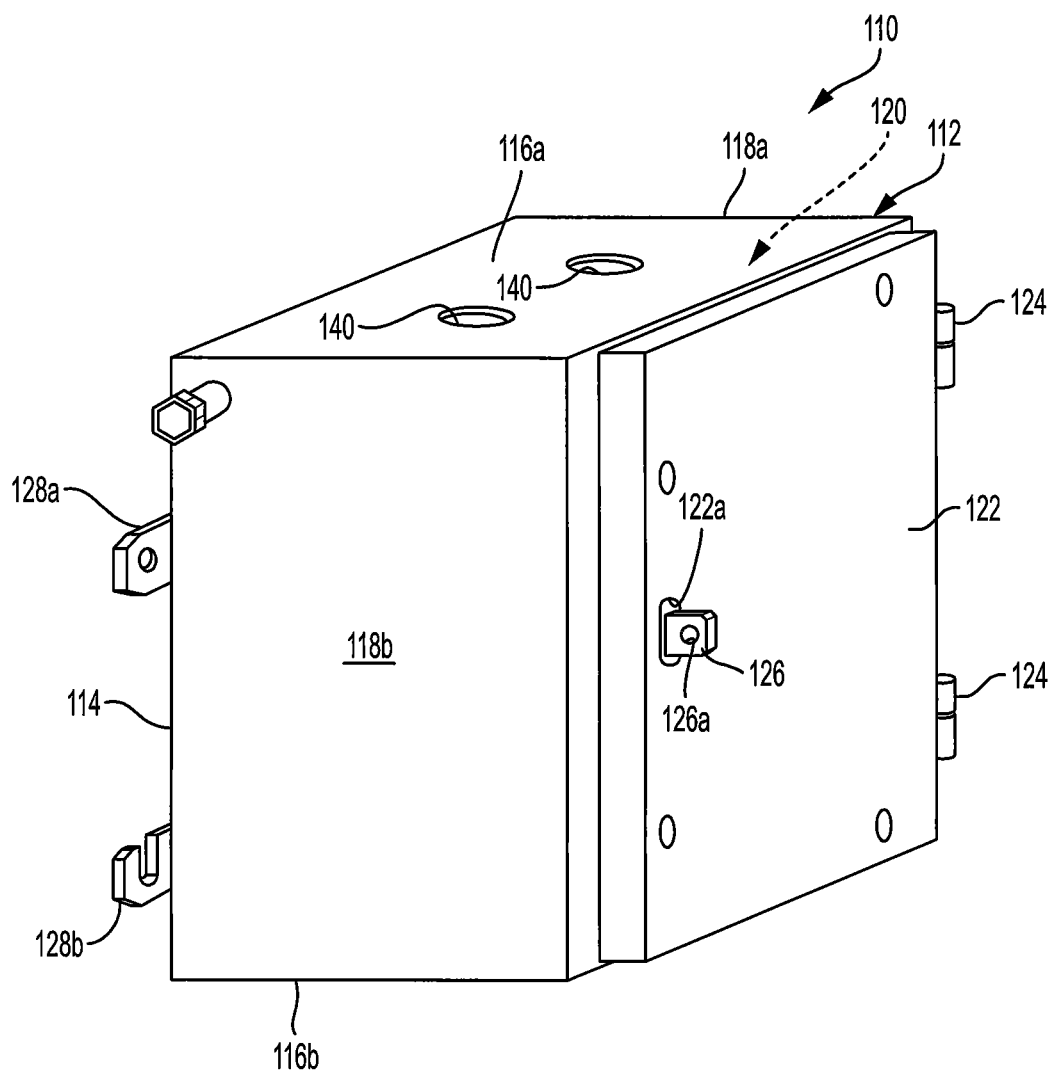
FIG. 4 is a front perspective view of a link box according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The term "about", as used herein with respect to a value or number, means that the value or number can vary by +/−twenty percent (20%).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring to FIGS. 4, 5, 6A-6E and 7, a link box 110, according to some embodiments of the present invention is illustrated. The illustrated link box 110 includes a housing 112 having a base panel 114 with opposite first and second walls 116a, 116b, and opposite third and fourth walls 118a, 118b extending outwardly therefrom to form an enclosure 120. A door 122 is movably secured to the housing 112 via hinges 124, and is movable between open and closed positions. The door 122 covers the enclosure 120 when in the closed position, and provides access to the enclosure 120 and the electrical connectors 130 (e.g., sheath voltage limiters (SVLs), etc.) mounted therewithin when in the open position, as would be understood by one skilled in the art. A locking member 126 associated with the housing 12 is configured to be inserted through an aperture 122a formed in the door 122, as illustrated. A lock or other mechanism may be inserted through the aperture 126a in the locking member to secure the door 122 in the closed position, as would be understood by one skilled in the art. The illustrated housing 112 also includes mounting brackets 128a, 128b that facilitate mounting the link box 110 to a wall, floor, or other structure.

Link boxes according to embodiments of the present invention are not limited to the illustrated configuration of the housing 112 and door 122. Link boxes according to embodiments of the present invention may have housings and doors with various shapes and configurations. In addition, the housing 112 and door 122 may be formed from various materials. Exemplary materials may include polymeric materials, as well as metallic materials, such as stainless steel, aluminum, etc.

Figure 5:
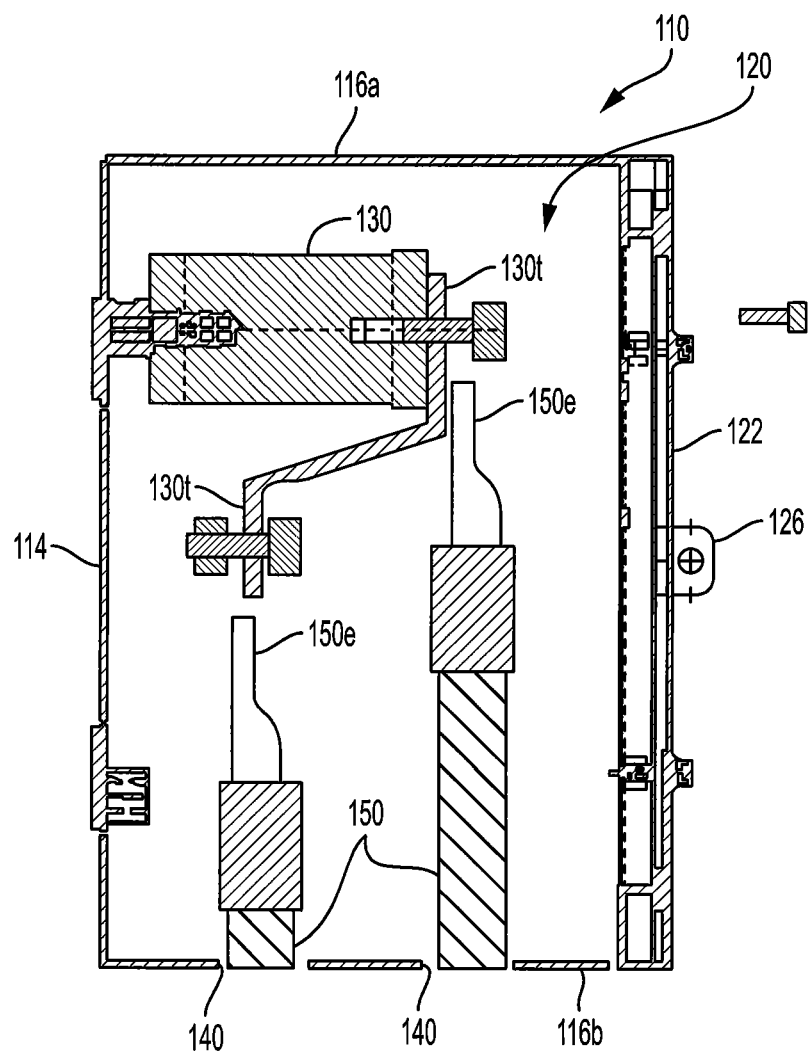
FIG. 5 is a side sectional view of the link box of FIG. 4.

The illustrated link box 110 includes a plurality of apertures 140 formed through wall 116b in adjacent, spaced-apart relationship. Although only two apertures 140 are illustrated, it is understood that various numbers of apertures 140 are possible. Each aperture 140 provides access to a respective electrical connector 130 within the enclosure 120 for a respective cable 150. For example, as illustrated in FIG. 5, a pair of cables 150 are inserted into the enclosure 120 via respective apertures 140. Each cable 150 has an end portion 150e configured to be attached to a terminal 130t of the illustrated electrical connector (i.e., SVL) 130. Although not illustrated in FIG. 5, each cable 150 is inserted through a respective aperture 140 via a respective cable entry seal 160, that will be described below.

Figure 6A:
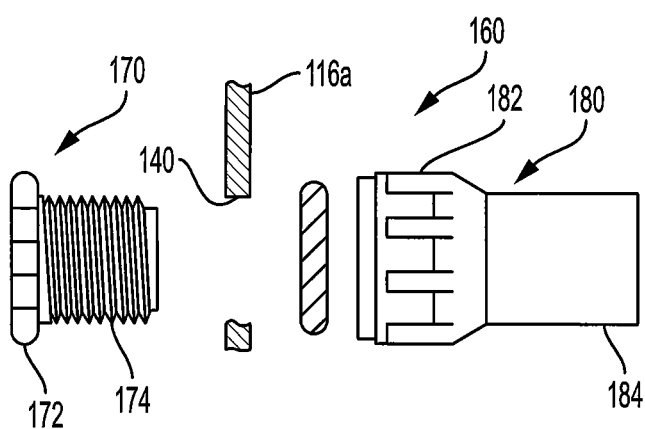
FIGS. 6A-6F illustrate a cable entry seal for use with the link box of FIG. 4, according to some embodiments of the present invention.
Figure 6B:
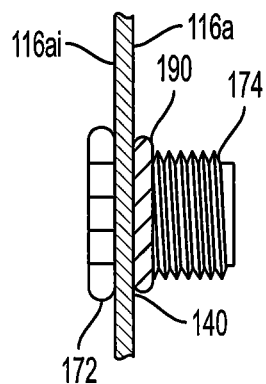

Referring to FIGS. 6A-6E, each cable entry seal 160 has a passageway 160p (FIG. 6D) extending therethrough that is configured to receive a cable 150 that is inserted into the housing 112 for connection to an electrical connector 130. Each cable entry seal 160 includes first and second parts 170, 180 that are removably secured together. The first part 170 includes a flange 172 and an externally-threaded portion 174 that extends outwardly from the flange 172, as illustrated. The externally-threaded portion 174 of the first part 170 is inserted through an aperture 140 from within the enclosure 120 such that the flange 172 abuts an internal surface 116ai of the wall 116a, as illustrated in FIG. 6B.

The flange 172 serves the function of a nut that is configured to be engaged, either by hand or via a tool, and to facilitate threadingly engaging the externally-threaded portion 174 into the second part 180. In some embodiments, the flange 172 may have a generally hexagonal (or other polygonal) peripheral shape configured to be engaged by a wrench, socket or other tool. However, the flange 172 may have various shapes without limitation.

The second part 180 includes an internally-threaded body 182 and a seal conduit or tube 184 that extends outwardly from the internally-threaded body 182, as illustrated. The internally-threaded body 182 is configured to be threadingly engaged with the externally-threaded portion 174 of the first part 170 such that the cable entry seal 160 is secured to the wall 116a. The seal conduit 184 is configured to surround and seal the cable received in the passageway 160p. For example, in some embodiments, the seal conduit 184 is a heat-shrinkable tube that is configured to, upon the application of heat (FIG. 6E), shrink around and seal the cable 150. Exemplary heat-shrinkable materials for the seal conduit 184 include, but are not limited to, polyolefin, fluoropolymer, polyvinyl chloride (PVC), neoprene, silicone elastomer, and fluoropolymer elastomer.

The illustrated cable entry seal 160 further includes a seal element 190, such as an elastomeric O-ring, disposed around the externally-threaded portion 174 of the first part 170. The seal element 190 is configured to provide a water tight connection between the first and second parts 170, 180. In other embodiments, the seal element 190 may be located within the internally-threaded body 182 of the second part 180.

Embodiments of the present invention are not limited to the illustrated configuration of the cable entry seal 160 and how it is attached to the wall of the housing 112. For example, in other embodiments as illustrated in FIG. 6F, the first part 170 may include an internally threaded portion 175 that is configured to threadingly engage an externally-threaded portion 177 of the second part 180. The externally-threaded portion 177 of the second part 180 would be connected to the seal conduit 184 that would be configured to seal a cable 150.

Figure 6C:
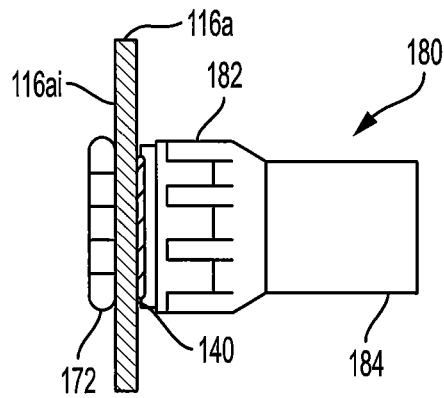
Figure 6D:
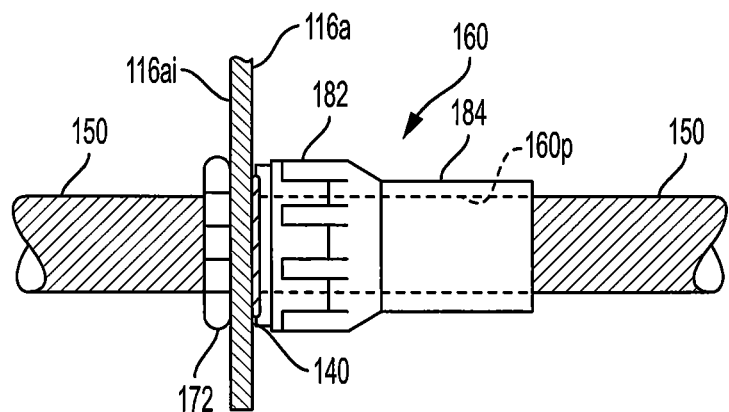
Figure 6E:
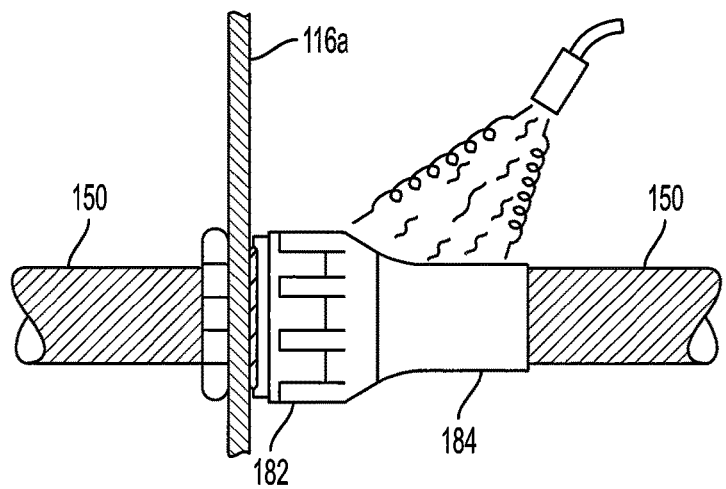
Figure 6F:
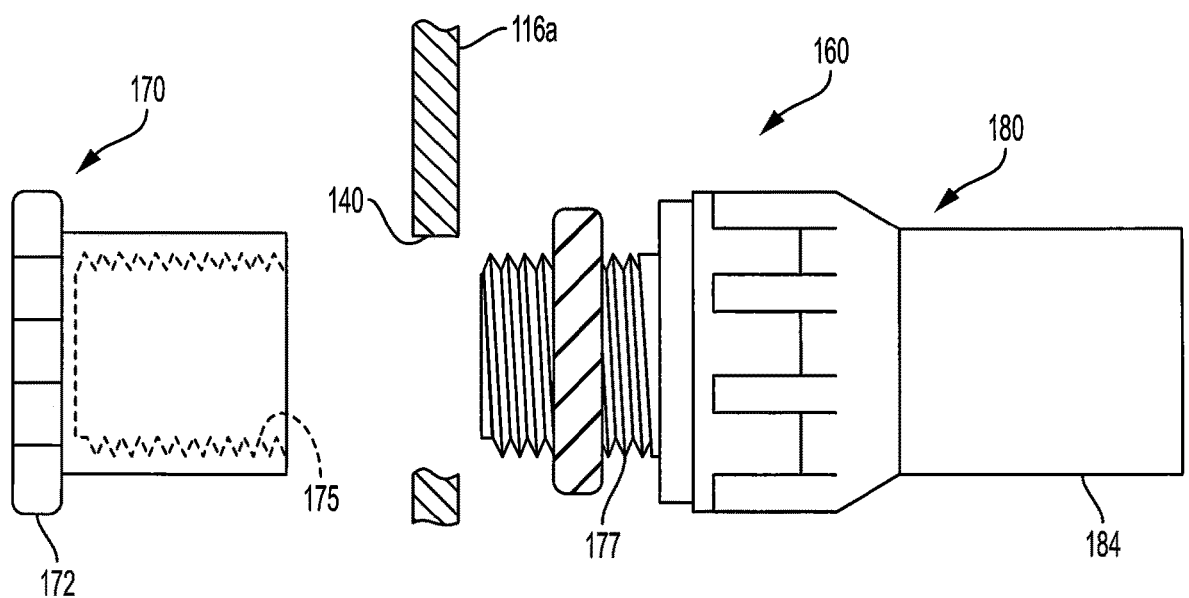

To connect a cable 150 to an electrical connector 130 within the enclosure 120 of the link box 110, a cable entry seal 160 is first secured to the wall 116a of the housing 112, as illustrated in FIG. 6C. This is accomplished by inserting the first part 170 through the aperture 140 and threadingly engaging the externally-threaded portion 174 of the first part 170 with the internally-threaded portion 182 of the second part 180 so that the cable entry seal 160 is secured to the wall 116a (FIG. 6C). A cable 150 is then inserted through the cable entry seal 160 and into the enclosure 120 of the housing 112 (FIG. 6D). The cable end 150e is connected to a terminal 130t of an electrical connector 130, and then heat is applied to the seal conduit 184, as illustrated in FIG. 6E to cause the seal conduit 184 to shrink and seal around the cable 150.

To remove the cable 150 from the link box, it is not necessary to cut the heat shrink tubing 184. Instead, the first and second parts 170, 180 of the cable entry seal 160 can be unscrewed and separated from each other. The cable end 150e can be removed from a connector 130t and the cable 150 can be easily removed through the aperture 140.

Figure 7:
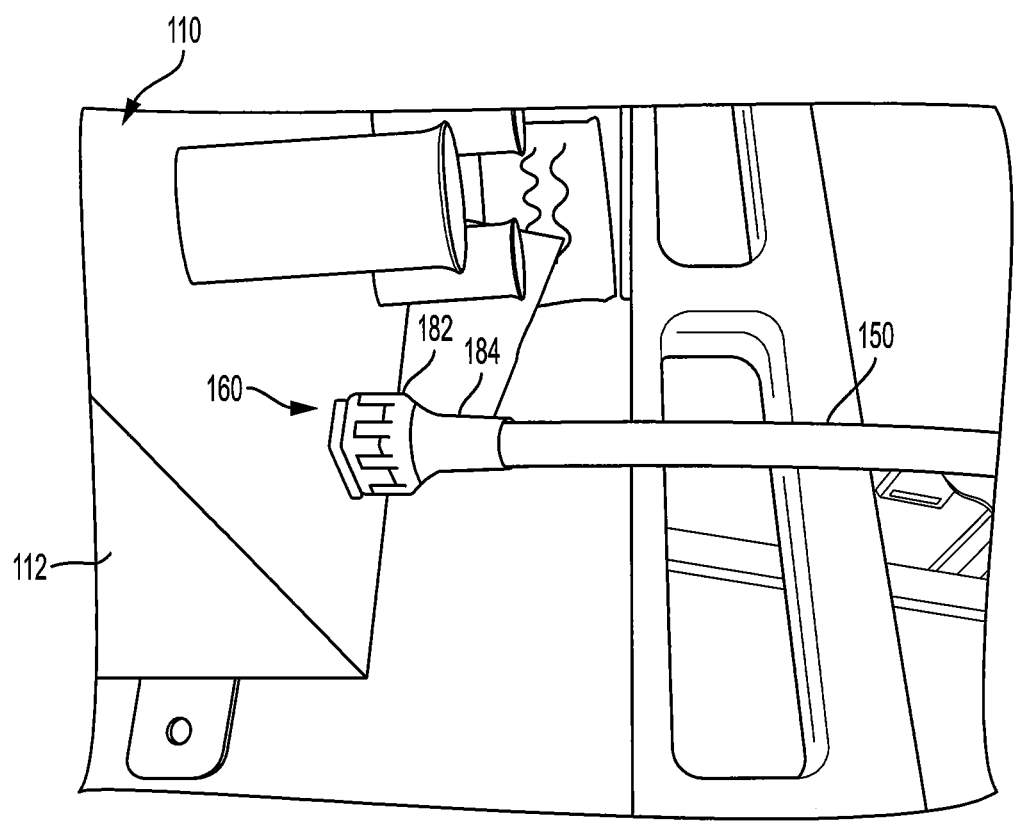
FIG. 7 illustrates a cable entry seal utilized with a link box according to some embodiments of the present invention.

FIG. 7 illustrates a portion of a link box 110 having a cable entry seal 160 secured at an aperture in a wall thereof and with a cable 150 inserted therethrough. The seal conduit 184 of the cable entry seal 160 has had heat applied thereto and seals the cable 150.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:
1. A link box, comprising:
   a housing that defines an enclosure;
   an electrical connector mounted to the housing within the enclosure, the electrical connector comprising a first terminal and a second terminal;
   first and second apertures formed through a wall of the housing in spaced-apart relationship;
   a first cable entry seal mounted to the first aperture and having a passageway extending through a length thereof and configured to receive a first cable inserted into the housing for connection to the first terminal; and
   a second cable entry seal mounted to the second aperture and having a passageway extending through a length thereof and configured to receive a second cable inserted into the housing for connection to the second terminal;
   wherein each of the first and second cable entry seals comprises:
      a first part comprising a flange and an externally-threaded portion that extends outwardly from the flange, wherein the externally-threaded portion is inserted through a respective one of the first and second apertures from within the enclosure such that the flange abuts an internal surface of the wall; and a second part comprising an internally-threaded body and a seal conduit that extends outwardly from the internally-threaded body, wherein the internally-threaded body is threadingly engaged with the externally-threaded portion of the first part such that the second part engages an external surface of the wall and such that the respective cable entry seal is secured to the wall, and wherein the seal conduit is configured to surround and seal a respective one of the first and second cables received in the passageway, a seal element disposed around a section of the externally-threaded portion of the first part or located within the internally-threaded body, wherein the seal element is configured to provide a water tight connection between the first and second parts, and wherein the seal element is an elastomeric O-ring.

2. The link box of claim 1, wherein the seal conduit of each respective first and second cable entry seal is a heat-shrinkable tube that is configured to, upon an application of heat, shrink around and seal the respective one of the first and second cables.

3. The link box of claim 2, wherein the heat-shrinkable tube comprises polyolefin, fluoropolymer, polyvinyl chloride (PVC), neoprene, silicone elastomer, or fluoropolymer elastomer.

4. The link box of claim 1, wherein the housing comprises a base panel, opposite first and second walls extending outwardly from the base panel, and opposite third and fourth walls extending outwardly therefrom extending outwardly from the base panel.

5. The link box of claim 1, further comprising a door movably secured to the housing between open and closed positions, wherein the door covers the enclosure when in the closed position, and provides access to the enclosure when in the open position.

6. The link box of claim 1, wherein the electrical connector is a sheath voltage limiter.

7. A link box, comprising:
a housing that defines an enclosure;
an electrical connector mounted to the housing within the enclosure;
an aperture formed through a wall of the housing; and
a cable entry seal having a passageway extending through a length thereof and configured to receive a cable inserted into the housing for connection to the electrical connector, the cable entry seal comprising:
a first part comprising a flange and an internally-threaded portion that extends outwardly from the flange, wherein the internally-threaded portion is inserted through the aperture from within the enclosure such that the flange abuts an internal surface of the wall;
a second part comprising an externally-threaded body and a heat-shrinkable tube connected to the externally-threaded body, wherein the externally-threaded body is configured to threadingly engage with the internally-threaded portion such that the cable entry seal is secured to the wall, and wherein the heat-shrinkable tube is configured to, upon an application of heat, shrink around and seal the cable received in the passageway; and
a seal element configured to provide a water tight connection between the first and second parts.

8. The link box of claim 7, wherein the seal element is disposed around a section of the internally-threaded portion of the first part or located within the externally-threaded body of the second part.

9. The link box of claim 7, wherein the seal element is an elastomeric O-ring.

10. The link box of claim 7, wherein the housing comprises a base panel, opposite first and second walls extending outwardly from the base panel, and opposite third and fourth walls extending outwardly therefrom extending outwardly from the base panel.

11. The link box of claim 7, further comprising a door movably secured to the housing between open and closed positions, wherein the door covers the enclosure when in the closed position, and provides access to the enclosure when in the open position.

12. The link box of claim 7, wherein the electrical connector is a sheath voltage limiter.

* * * * *